July 12, 1927.
J. A. HEANY
INCANDESCENT ELECTRIC LAMP
Filed June 28, 1918
1,635,320
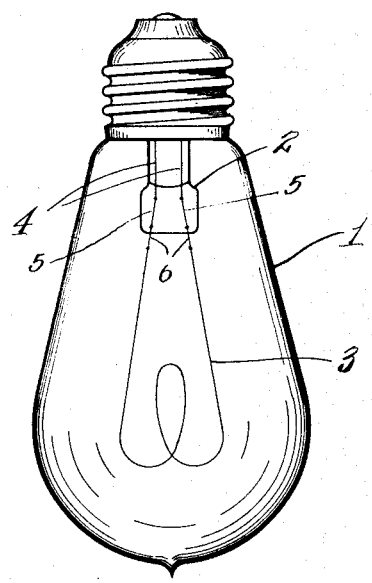
INVENTOR
JOHN ALLEN HEANY.
BY
Lewis O. Hutchinson
ATTORNEY Patented July 12, 1927.

1,635,320

UNITED STATES PATENT OFFICE.

JOHN ALLEN HEANY, OF NEW HAVEN, CONNECTICUT.

INCANDESCENT ELECTRIC LAMP.

Application filed June 28, 1918. Serial No. 242,481½.

This invention relates to improvements in incandescent lamps or like devices having gas tight receptacles with leading in wires sealed gas-tight through a vitreous wall.

In the manufacture of incandescent lamps, the leading-in wires are sealed in place by inserting them in an opening in the glass stem of the lamp, heating the glass until it is softened and then squeezing the soft glass firmly into contact with the wires, as by the application of a clamp. The glass remains in contact with the wires until it sets to a hard condition from its soft or plastic state. As the glass and wires are brought to normal temperatures, a contraction of the glass and wires takes place. If the seal thus made is not tight, then a leakage will occur, which will cause a rapid deterioration of the lamp, thus cutting short the life thereof.

Platinum has heretofore been used as a leading-in wire, because it was endowed with certain characteristics which made its use successful under certain conditions. Attempts have been made to make use of other metals in place of platinum, but most of those attempts have proved failures. Several reasons have been ascribed for these failures. The first reason generally advanced is that the coefficients of expansion of the metal and glass differed. From that it has been argued that the expansion of the metal has cracked the glass and destroyed the seal. A further explanation is that when the metal is heated at the time of the making of the seal, an oxide of the metal is formed on the surface of the wire, which interposes a porous film between the metal and the glass allowing a leakage to take place. The appearance of bubbles in the glass around the wire, which undoubtedly prevents the seal from being tight, is attributed to two different causes. The first explanation of the phenomenon is that occluded gases of the metal have been driven out forming these bubbles. A second explanation is that these bubbles are the result of some chemical reaction between the metal and some element of the glass.

My experiments have convinced me that the true cause of the failure of the seal is the formation of the oxide of the metal. Unless there is a very considerable change in temperature, the difference in the expansion of the glass and the metal is not sufficient to cause the glass to crack. If care be taken in the arrangement of the elements of the lamp so that the seal and stem are not subjected to a high heat, there will not be a sufficient difference in the expansion to cause a cracking to occur. The lamps of to-day are so constructed as to comply with the above requirements, thus obviating the possibility of a failure of the seal due to the difference in the coefficients of expansion. Furthermore, the failure of the seal is not due to occluded gases. When the leading-in wires are sealed into the stem the temperature is far greater than at any subsequent time in the life of the lamp. As a result whatever occluded gases there may have been are all driven out. The metal is prevented from absorbing any gas due to the fact that the glass is made to flow along the wires. By way of experiment a copper lead wire was placed in a glass tube, one end of which was sealed. The other end was attached to a vacuum line and the tube was exhausted. Beginning at the sealed end and working in the direction of the exhaust, the tube was heated until plastic and forced into contact with the wire. In this way any occluded gases present were driven off and carried away and the formation of an oxide was prevented. The wire, after the operation, was bright showing the absence of the oxide. But, nevertheless, the bubbles were present. This experiment shows that the bubbles were not due to occluded gas or the formation of an oxide, but rather are due to some chemical reaction between the metal and the glass.

The reason why platinum wire was so successful as a leading-in wire was not because of the fact that its coefficient of expansion is nearly the same as that of glass, but rather because it is non-oxidizable and does not react chemically with the glass. Its disadvantages, however, are nearly as great as its advantages. In the first place it is quite a poor conductor of electricity, secondly its cost makes it nearly prohibitive and thirdly it is almost impossible to obtain any at the present time.

It is one of the objects of my invention to provide a wire which can be used as leading-in wires and which will make a perfect seal with the glass stem.

A further object is to provide a wire which can be extended from the stem into the body of the bulb and act as the anchor wires to support the light emitting portion of the lamp.

To accomplish these objects, I make use of a lead alloy wire, a lead coated wire or just a plain lead wire. When any of these wires are made use of, the wire, after the sealing has been accomplished, is bright in color showing that there is no oxide remaining thereon after the process of sealing-in is completed. This phenomenon is explained as follows: The type of glass which is ordinarily used in the formation of the stem of an incandescent lamp is that known as lead glass. When this glass is in a plastic condition it has a great affinity for lead oxide. The lead oxide formed in the process is completely absorbed by the glass. It is not known exactly what occurs with respect to the other metal used in the alloy wire. There may be no oxide of this metal formed or the oxide of this metal, if formed, is masked by the lead oxide. The fact remains, however, that the metal has no oxide coating and the seal is perfect. Furthermore, there are no bubbles formed in the glass surrounding the wires. Whatever chemical reaction takes place is of such a nature that no detrimental effect is had upon the seal.

The accompanying drawing discloses, in the single figure thereof, an ordinary incandescent electric lamp, the seal of which is formed in accordance with my invention.

In the drawings, 1 is the bulb, 2 the stem, 3 the illuminant, 4 the leading-in wires, and 5 the sealing-in wires.

When either the lead alloy wire or the lead coated wire is used the wires to form the leading-in wires are placed in the glass stem 2 in the usual way, heated and the glass pressed around the wires 4 in the well known manner. The lead will not melt out of the alloy nor will it run off from the wire if it be properly coated thereon. It will soften when subjected to the heat required to melt the glass forming the stem but will remain in place. When a plain lead wire is used, it is necessary to provide a construction so that the lead will not flow away upon coming into a molten condition.

The alloy wire may have as its constituents any one of a number of metals, such as copper, iron, aluminum, nickel and the like; the only absolute rqeuirement is that one of the constituents shall be lead. The wire which is coated with lead may be any one of the above. The only requirement of these metals is that they shall not have a volatilizing point lower than the softening point of the glass. I prefer to use an alloy of copper and lead in which the lead is from 5 to 10 per cent of the total composition or a copper wire coated with lead, the lead being in about the same proportion as in the alloy wire.

In the case of the alloy wire, the leading-in wires may be extended into the body of the bulb 1 to act as supports for the light emitting portion 3 of the lamp. In such a case it is contemplated that some other metal be incorporated in the wire to give it a certain amount of resiliency so that it will maintain the light emitting portion of the lamp in proper position.

The method above outlined results in overcoming the difficulties heretofore experienced in the forming of a seal for incandescent lamps. It contemplates no change in the composition of the glass now used for stems and bulbs. The resulting seal is perfect inasmuch as the oxides formed on the wire are absorbed by the glass leaving a clear surface of metal which makes a gas tight contact with the glass. Furthermore, there are no resulting bubbles to allow a leakage through the stem 2. There is no cracking of the stem as the difference in expansion between the metal and glass is inconsiderable due to the fact that the temperature of the lamp is not sufficiently high to cause appreciable expansion. Also, the wire thus used is quite inexpensive and easy to obtain.

I claim as my invention:

In an incandescent electric lamp, the combination of a stem formed of lead glass, a filament in said lamp and leading-in wires formed of a copper-lead alloy positioned in the stem and connected to said filament, the lead forming from five to ten per cent of the alloy.

In testimony whereof I hereunto affix my signature.

JOHN ALLEN HEANY.